(12) United States Patent
Steffier et al.

(10) Patent No.: US 11,117,838 B2
(45) Date of Patent: Sep. 14, 2021

(54) METHOD OF MAKING A FIBER PREFORM FOR CERAMIC MATRIX COMPOSITE (CMC) FABRICATION

(71) Applicant: Rolls-Royce High Temperature Composites Inc., Cypress, CA (US)

(72) Inventors: Wayne Steffier, Huntington Beach, CA (US); Michael Jacquinto, Bethlehem, PA (US); Stephen Harris, Long Beach, CA (US); Robert Shinavski, Mission Viejo, CA (US); Todd Engel, Long Beach, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 568 days.

(21) Appl. No.: 15/987,269

(22) Filed: May 23, 2018

(65) Prior Publication Data

US 2019/0359531 A1  Nov. 28, 2019

(51) Int. Cl.
| | | |
|---|---|---|
| C04B 35/80 | (2006.01) |
| C04B 35/634 | (2006.01) |
| C04B 35/638 | (2006.01) |
| C04B 35/657 | (2006.01) |
| C04B 35/628 | (2006.01) |

(52) U.S. Cl.
CPC ...... *C04B 35/806* (2013.01); *C04B 35/62863* (2013.01); *C04B 35/638* (2013.01); *C04B 35/63492* (2013.01); *C04B 35/657* (2013.01); *C04B 2235/3826* (2013.01); *C04B 2235/524* (2013.01); *C04B 2235/5244* (2013.01); *C04B 2235/604* (2013.01); *C04B 2235/612* (2013.01); *C04B 2235/656* (2013.01)

(58) Field of Classification Search
CPC .................................................. C04B 35/806
See application file for complete search history.

(56) References Cited

U.S. PATENT DOCUMENTS

| | | |
|---|---|---|
| 5,455,106 A | 10/1995 | Steffier |
| 7,754,126 B2 | 7/2010 | Subramanian et al. |
| 2016/0108980 A1 | 4/2016 | Moore et al. |
| 2016/0115086 A1 | 4/2016 | Tuertscher et al. |
| 2017/0328217 A1 | 11/2017 | Gallier et al. |

FOREIGN PATENT DOCUMENTS

WO  WO 2014/193565 A1  12/2014

*Primary Examiner* — Larry W Thrower
(74) *Attorney, Agent, or Firm* — Crowell & Moring LLP

(57) ABSTRACT

A method of making a fiber preform for ceramic matrix composite (CMC) fabrication that utilizes a fugitive binder and a machining step is described. The method includes, according to one embodiment, laying up a plurality of plies to form a stack, where each ply comprises an arrangement of fibers. The stack is infiltrated with a polymer at an elevated temperature to form an infiltrated stack that is cooled to form a rigid preform. The rigid fiber preform is machined to have a predetermined shape, such that a machined fiber preform is formed. A composite assembly including the machined fiber preform is formed and then the composite assembly is heated at a sufficient temperature to pyrolyze the polymer. Thus, a porous preform of a predetermined geometry is formed for further processing into a CMC.

11 Claims, 3 Drawing Sheets

METHOD OF MAKING A FIBER PREFORM FOR CERAMIC MATRIX COMPOSITE (CMC) FABRICATION

TECHNICAL FIELD

The present disclosure is directed generally to ceramic matrix composite (CMC) fabrication and more specifically to a method to improve the preforming process.

BACKGROUND

A typical method for the production of silicon carbide (SiC) based ceramic matrix composites (CMCs) includes weaving dry fiber into a two-dimensionally (2D) woven fabric or drum-winding to form a unidirectional tape, preforming plies of the fabric or tape to the desired geometry, coating the fiber preform with a fiber interphase, rigidizing the preform with silicon carbide using chemical vapor infiltration (CVI), infiltrating a ceramic slurry into the rigidized preform, and subsequently melt infiltrating with molten silicon or an alloy thereof to form a ceramic matrix composite.

In some cases, particularly when fabricating CMC components of complex shapes, the preforming process can be energy intensive and time consuming. Parts such as the attachment features of turbine vanes and blades and the tails of vanes may require a significant number of plies that differ only slightly in size and/or shape. Ensuring that each ply is cut to the proper dimensions and laid up in the correct location and orientation can be a logistical challenge. An improved and simplified preforming process would be advantageous.

BRIEF SUMMARY

An improved method of making a fiber preform for ceramic matrix composite (CMC) fabrication that utilizes a fugitive binder and a machining step is described herein.

According to one embodiment, the method comprises laying up a plurality of plies to form a stack, where each ply comprises an arrangement of fibers. The stack is infiltrated with a polymer at an elevated temperature to form an infiltrated stack that is cooled to form a rigid fiber preform. The rigid fiber preform is machined to have a predetermined shape, such that a machined fiber preform is formed. A composite assembly including the machined fiber preform is formed and then the composite assembly is heated at a sufficient temperature to pyrolyze the polymer. Thus, a porous preform of a predetermined geometry is formed for further processing into a CMC.

According to a second embodiment, the method comprises laying up a plurality of infiltrated plies to form a stack, where each infiltrated ply comprises an arrangement of fibers embedded in a polymer. The stack is heated to bond together the infiltrated plies into a bonded stack, which is then cooled to form a rigid fiber preform. The rigid fiber preform is machined to have a predetermined shape, such that a machined fiber preform is formed. A composite assembly including the machined fiber preform is formed and then the composite assembly is heated at a sufficient temperature to pyrolyze the polymer. Thus, a porous preform of a predetermined geometry is formed for further processing into a CMC.

DETAILED DESCRIPTION

An improved and simplified preforming method for fabricating ceramic matrix composite (CMC) components or regions of components that include complex geometries is described. The method includes a machining step and utilizes a "fugitive" binder that is removed after preforming.

The preforming approach can avoid the challenges of cutting, kitting and laying-up of plies of slightly different sizes to form a complex geometry. Instead, plies can be laid up in simple geometries, such as plates or stacks, and infiltrated with a polymer to form a rigid fiber preform that is then machined to the requisite dimensions. Alternatively, infiltration with the polymer may occur prior to lay-up, followed by bonding of the infiltrated plies to form a rigid fiber preform that can be machined to the desired shape. After machining, the machined preform may be tooled to form a composite assembly with other preforms and/or plies that may also be infiltrated with polymer. In a final step, the polymer may be removed from the composite assembly by pyrolysis to form a porous preform that has the shape of the CMC to be formed. The polymer employed during fabrication may be referred to as a fugitive binder since it does not appear in the final composite.

Figure 1:
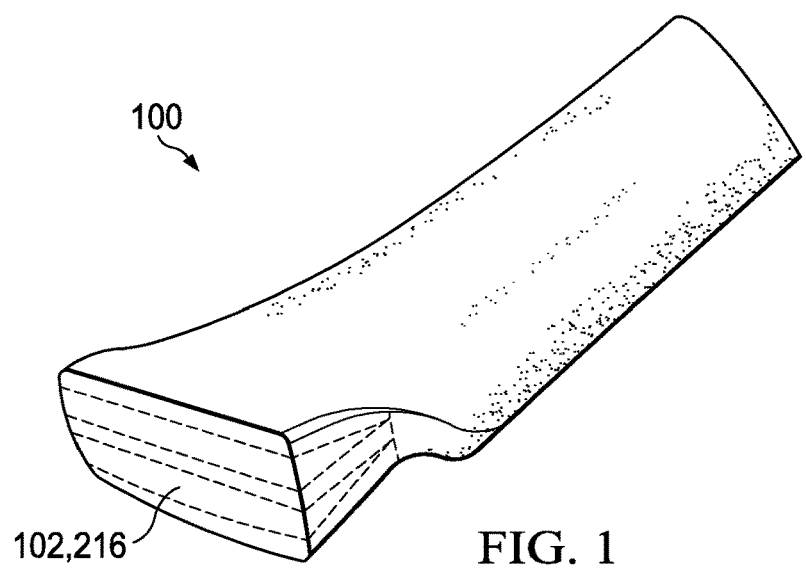
FIG. 1 is a schematic of a turbine blade preform.
Figure 2A:
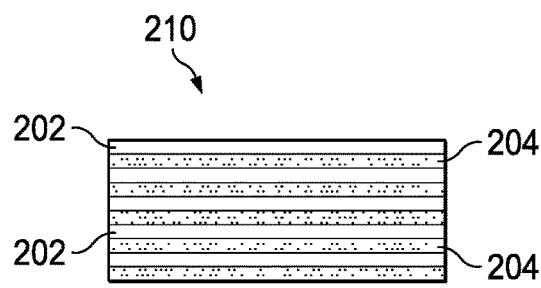
FIGS. 2A-2C show exemplary steps in fabricating a portion of the turbine blade preform shown in FIG. 1.
Figure 2B:
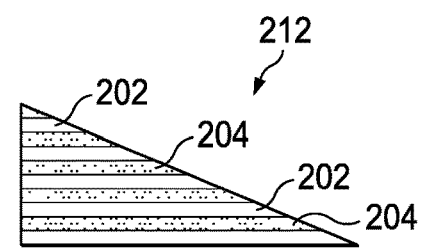
Figure 2C:
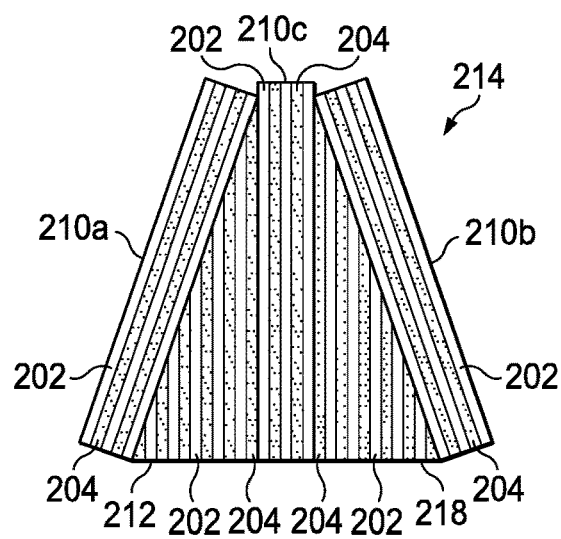

The method may be employed to preform complex components or regions of components prior to further processing to form a CMC. For example, FIG. 1 shows an exemplary turbine blade preform 100 and FIGS. 2A-2C show exemplary steps in fabricating an attachment region 102 of the turbine blade preform 100. Referring to FIG. 2A, the preforming method entails forming a rigid fiber preform 210 that includes arrangements of fibers (e.g., plies) 202 embedded in a polymer 204, which as noted above functions as a fugitive binder. The rigid fiber preform 210 is then machined to have a predetermined shape, as shown in FIG. 2B, thus forming a machined fiber preform 212 that may have a higher dimensional accuracy than preforms prepared using conventional methods. A composite assembly 214 that includes the machined fiber preform 212 is formed next, as shown in FIG. 2C. Finally, the composite assembly 214 is heated at a sufficient temperature to pyrolyze the polymer 204, thereby forming a porous preform 216 having a predetermined geometry for further processing into a CMC. In this example, the porous preform 216 is shaped to be utilized for the attachment region 102 of the turbine blade preform 100 of FIG. 1. It should be noted that the term "preform," when used herein, may be understood to refer to refer to a "fiber preform," even if not explicitly stated.

The polymer, which may alternatively be referred to as a polymeric binder or a fugitive binder, may be an organic polymer (e.g., an aliphatic organic polymer) that preferably has a low ash content. Examples include polyethylene, polyethylene carbonate, polypropylene carbonate, and polyvinyl alcohol. The fibers may be ceramic fibers, such as silicon carbide, silicon nitride, or alumina fibers, and they may be continuous fibers having a length much greater than the diameter or width. Typically, the fibers take the form of fiber tows that include tens to hundreds of individual filaments to ensure sufficient flexibility for weaving, preforming and/or ease of handling. The terms "fibers" and "fiber tows" may be used interchangeably in this disclosure.

The processing steps to arrive at the rigid fiber preform shown in FIG. 2A may include (a) laying up of plies followed by polymer infiltration or (b) lamination or infiltration of individual plies, followed by lay-up. Both of these embodiments are described below, and then the rest of the preforming process (e.g., machining, assembly, and removal of fugitive binder) is discussed.

Figure 3A:
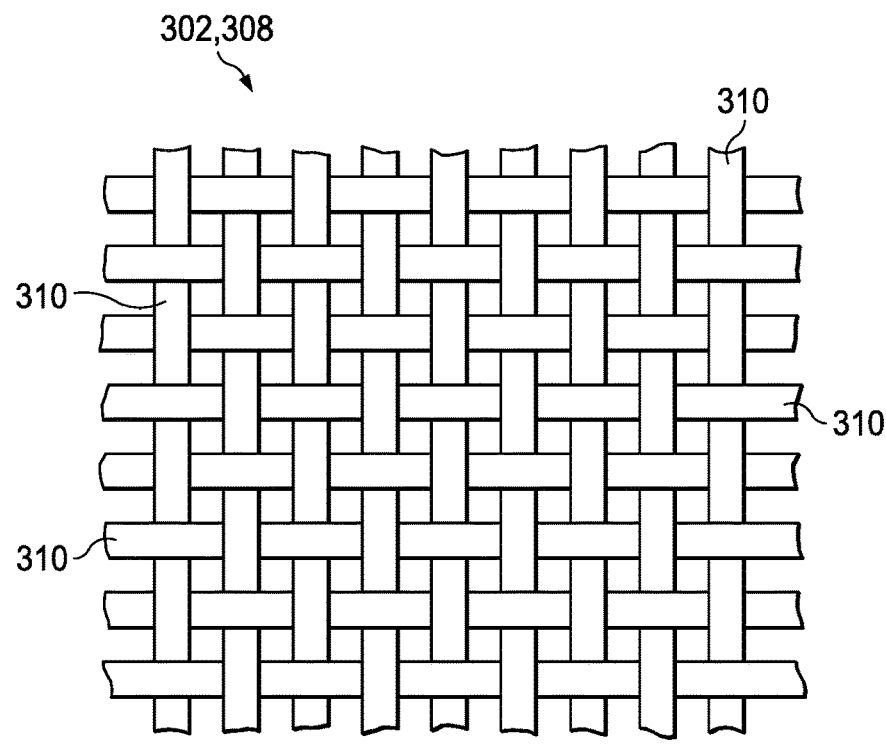
FIGS. 3A and 3B show exemplary arrangements of fibers (or fiber tows) including a bidirectional or woven arrangement and a unidirectional arrangement, respectively.
Figure 3B:
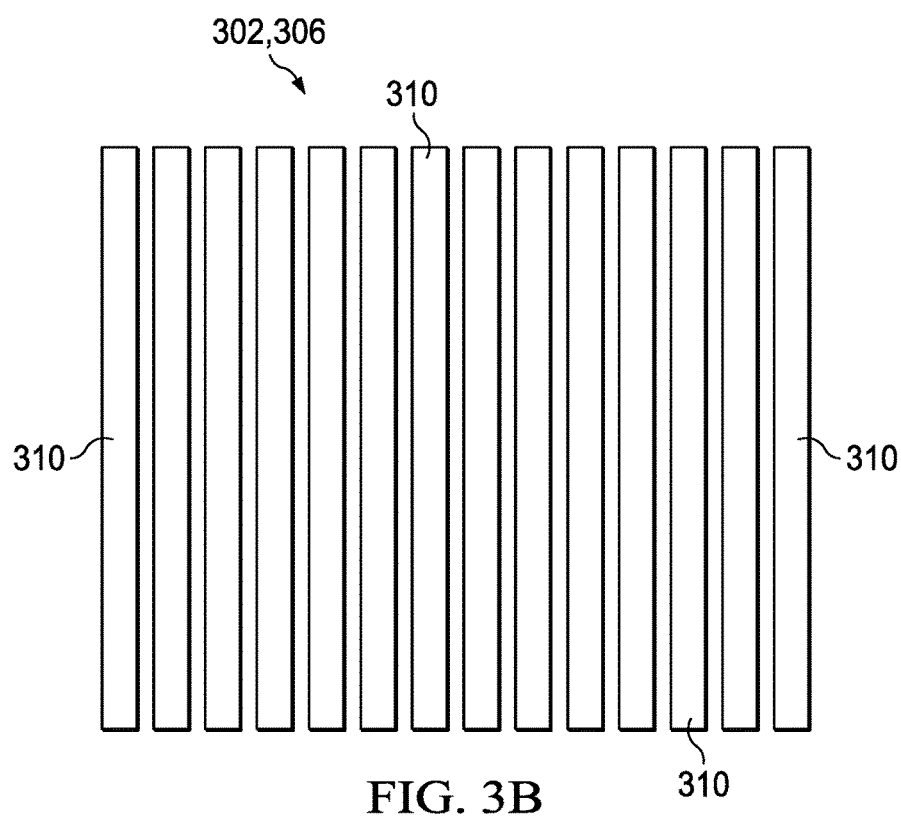
Figure 4:
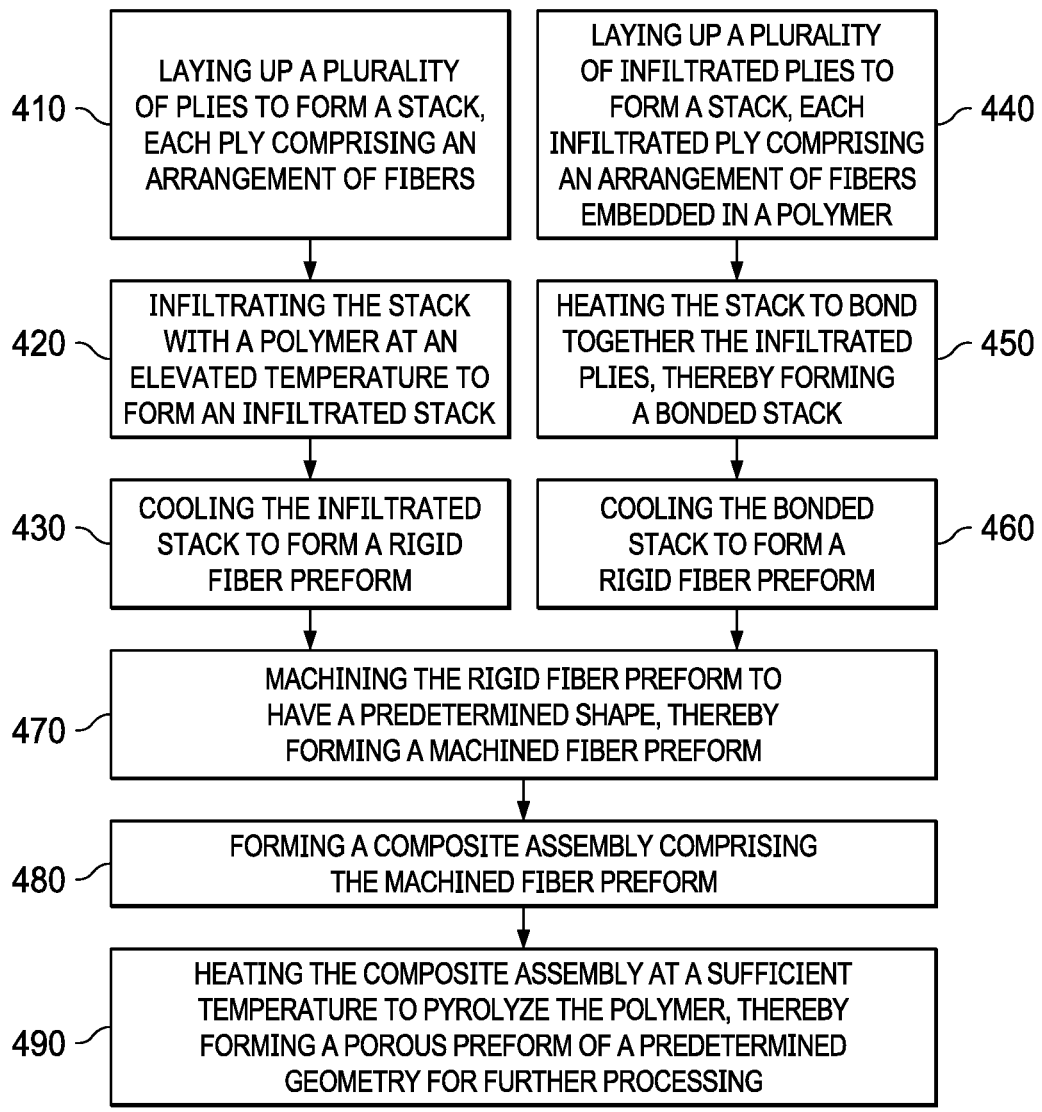
FIG. 4 is a flow chart showing the method according to first and second embodiments.

Referring now to the flow chart of FIG. 4, according to a first embodiment for forming the rigid fiber preform where polymer infiltration follows lay-up, the preforming method entails laying up 410 a plurality of plies to form a stack. As illustrated in FIGS. 3A and 3B, each ply 302 comprises an arrangement of fibers or fiber tows 310, e.g., a unidirectional arrangement 306, a bidirectional arrangement such as a woven arrangement 308, or another suitable arrangement of fibers. The stack of plies 302 may have a simple shape, such as that of a plate or block, since more complicated geometries may be incorporated during the machining step. The lay-up may proceed in a desired orientation sequence so as to achieve a particular orientation of each ply with respect to the underlying ply. The stack may be formed in a double-sided tool or a single-sided tool, optionally with the aid of pressure or vacuum. The lay-up may be a wet or dry process.

Referring again to FIG. 4, after lay-up, the stack is infiltrated 420 with a polymer at an elevated temperature to form an infiltrated stack. Advantageously, the polymer is sufficiently flowable at the elevated temperature to penetrate interstices of the stack, such that the fibers or fiber tows may be uniformly coated. In one example, infiltration 420 of the stack may entail placing a polymeric sheet comprising the polymer on the stack, and heating the polymeric sheet to the elevated temperature to induce flow of the polymer into the interstices of the stack (e.g., under gravity). The elevated temperature may be in a range sufficient to soften or melt the polymer, such as from about 80° C. to about 200° C., or from about 100° C. to about 130° C. An ambient environment (e.g., air) is typically suitable for infiltration. After infiltration 420, the infiltrated stack may be passively or actively cooled (e.g., via an air flow) 430 to room temperature (e.g., 20° C. to 25° C.) to obtain the rigid fiber preform 210 shown in FIG. 2A. In some cases, the infiltrated stack may be compressed after infiltration while the stack is still warm (e.g., before cooling 430 to room temperature). The pressing may be carried out using a low applied pressure in a range from about 50 psi to about 100 psi, or from about 0.3 MPa to about 0.7 MPa, to achieve a desired thickness, for example.

A second embodiment for forming the rigid fiber preform, where lay-up follows infiltration or lamination of the plies, is also described in reference to the flow chart of FIG. 4. The preforming method includes obtaining or forming a plurality of infiltrated plies, where each ply comprises a fiber arrangement embedded in a polymer, and laying up 440 the infiltrated plies to form a stack. As in the previous embodiment, the stack may have a simple geometry such as a plate or a block. The lay-up may proceed in a desired orientation sequence so as to achieve a particular orientation of each infiltrated ply with respect to the underlying infiltrated ply. The stack may be formed in a double-sided tool or a single-sided tool, optionally with the aid of vacuum or pressure. The lay-up may be a wet or dry process.

After lay-up 440, the stack of infiltrated plies is heated 450 to induce flow of the polymer and to bond together the plies to form a bonded stack. The heating and concomitant bonding 450 of the stack may be carried out at a low temperature sufficient to soften or melt the polymer. Typically, the temperature is in a range from about 80° C. to about 200° C., or from about 100° C. to about 130° C. An ambient environment (e.g., air) is typically suitable for bonding. After bonding 450, the bonded stack may be passively or actively cooled (e.g., via an air flow) 460 to room temperature (e.g., 20° C. to 25° C.) to obtain the rigid fiber preform 210 shown in FIG. 2A. In some cases, the stack may be compressed during bonding or after bonding while still warm (e.g., before cooling to room temperature). The pressing may be carried out using a low applied pressure in a range from about 50 psi to about 100 psi, or from about 0.3 MPa to about 0.7 MPa, to achieve a desired thickness, for example.

To form the infiltrated plies of the second embodiment, a polymer infiltration process or a lamination process may be employed. The former approach may entail placing a polymeric sheet comprising a polymer on the ply, and heating the sheet to induce flow of the polymer into interstices of the ply (e.g., under gravity), as described above for the stack. The latter approach may entail feeding the polymeric sheets and the ply into opposing rollers in a continuous or batch process and extracting a laminated (infiltrated) ply from the rollers on the downstream side. Polymer infiltration or lamination may be carried out at a temperature ranging from about 80° C. to about 200° C., or from 100° C. to about 125° C., to ensure flowability of the polymer. A compressive pressure may be applied as part of the lamination or infiltration process and/or afterwards, prior to cooling to room temperature. Pressing may allow a predetermined thickness of the infiltrated ply to be obtained and may also permit the ply spacing and fiber tow geometry (e.g., aspect ratio of cross-section) to be controlled. For example, oval or flattened cross-sectional geometries of the fiber tows may be desirable. Such a ply spacing and tow geometry can produce local fiber architectures that are more amenable to subsequent fiber coating and/or matrix processing, and may lead to improved mechanical properties in the final CMC. For example, better coating uniformity may be achieved as a consequence of the spreading and flattening of fiber tows during pressing. Suitable pressures may lie in a range from about 50 psi (about 0.3 MPa) to about 200 psi (about 1.4 MPa). Typically, lamination or infiltration is carried out in an ambient environment (e.g., air).

Additional details about forming laminated plies and a rigid preform using the laminated plies may be found in U.S. Patent Application Ser. No. 62/599,154, filed on Dec. 15, 2017, and entitled "Method of Making a Fiber Preform for Ceramic Matrix Composite (CMC) Fabrication Utilizing a Fugitive Binder," which is hereby incorporated by reference in its entirety.

Returning again to FIG. 2A, the rigid fiber preform 210, fabricated as set forth above, may be machined 470 to have a predetermined shape, such as the wedge shape shown in FIG. 2B. Thus, a machined fiber preform 212 is formed, as described in the flow chart of FIG. 4. The machining 470 may be carried out using machining methods known in the art, such as wet grinding with a resin-bonded diamond grinding wheel. As would be recognized by the skilled artisan, the machined fiber preform 212 is not limited to the geometry shown in FIG. 2B and may be formed into any shape that can be machined.

In a next step, as shown schematically in FIG. 2C and described in the flow chart of FIG. 4, a composite assembly 214 including at least the machined preform 212 is formed 480. The composite assembly 214 has the shape of part or all of a turbine engine component and may include one or more other (second, third, etc.) machined preforms 218 having the same or a different shape as the (first) machined preform 212. Each machined preform 212,218 includes multiple plies 202 embedded in a fugitive binder (polymer) 204. Also or alternatively, the composite assembly 214 may include one or more rigid fiber preforms that have not been machined and which are formed as described above from a stack of plies or infiltrated plies. For example, in FIG. 2C, first, second, and third rigid fiber preforms 210a,210b,210c having a simple plate-like shape are combined with two wedge-shaped machined fiber preforms 212,218 to form the composite assembly 214. Although a benefit of the process is avoiding cutting and arranging of individual plies, the composite assembly 214 may also include one or more plies, where each ply includes a fiber arrangement as described above (e.g., a unidirectional arrangement, a bidirectional arrangement such as a woven arrangement, or another suitable arrangement of fibers) embedded in a polymer.

Referring again to the flow chart of FIG. 4, the composite assembly may then be heated 490 at a sufficient temperature ("pyrolysis temperature") to pyrolyze the polymer, thereby forming a porous preform of any desired shape for further processing into a CMC. In other words, during heating, the fugitive binder is removed from the composite assembly 214 to form the porous preform 216. The polymer may decompose during pyrolysis to form a decomposition product that is primarily or exclusively made up of carbon dioxide and water. Thus, the polymer may be said to be low char-yielding. The pyrolysis temperature is higher than the temperature employed for infiltration or bonding (described above), and may be at least about 200° C. or at least about 250° C. and as high as about 1000° C. Using this preforming approach, it is possible to form the shape of a turbine blade attachment feature 102 without a laborious and complicated process of cutting and arranging individual plies.

To form a CMC from the porous preform prepared as described above, the method may further include CMC processing steps known in the art. For example, the porous preform may be coated with a fiber interphase material such as boron nitride to form a coated preform. The coated preform may be rigidized (e.g., using chemical vapor infiltration) to form a rigidized preform. Rigidization may refer to a coating process in which a matrix material such as silicon carbide is deposited on the fibers to stiffen the preform. The rigidized preform may be infiltrated with a slurry comprising a particulate matrix material to form an impregnated preform. The particulate matrix material includes ceramic particles that become part of the ceramic matrix after melt infiltration. Typically, these ceramic particles comprise silicon carbide, but they may also or alternatively include silicon nitride, alumina, and/or aluminosilicate. One or more reactive elements, such as carbon and/or refractory metals such as molybdenum or tungsten, may also be included in the slurry used to infiltrate the rigidized preform; such reactive element(s) may be present to react with the molten material during melt infiltration. The impregnated preform may be melt infiltrated with a molten metal or alloy, thereby densifying the impregnated preform and fabricating the CMC. In a preferred embodiment, the fibers or fiber tows of the CMC comprise silicon carbide and the ceramic matrix comprises silicon carbide. The CMC that is formed in this case may be referred to as a silicon carbide/silicon carbide or SiC/SiC composite.

EXAMPLE

Eight plies of Hi-Nicalon™ 2D fabric were dry stacked and a sheet of prototyping wax with sufficient volume to fill the interstices between fiber tows after pressing was placed on top. The stack was then heated to 120° C. in an oven in air to melt the wax and allow it to infiltrate into the plys. The warm infiltrated stack was then pressed between two plates to the desired thickness using through bolts and annular shims. After cooling, the resulting rigid preform was then machined into wedge shapes using conventional wet grinding with a resin bonded diamond grinding wheel. The machined preforms were then tooled together with other rigid preforms, and the wax was removed through thermal decomposition at 600° C. for 1 hr. After removal of the wax, the porous preform was then processed through the typical CMC manufacturing operations including fiber coating and rigidization through chemical vapor infiltration (CVI), and final slurry and melt infiltration to yield a dense composite component.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. A method of making a fiber preform for ceramic matrix composite (CMC) fabrication, the method comprising:
   laying up a plurality of plies to form a stack, each ply comprising an arrangement of fibers;
   infiltrating the stack with a polymer at an elevated temperature sufficient to soften or melt the polymer to form an infiltrated stack;
   cooling the infiltrated stack to form a rigid preform;
   machining the rigid preform to have a predetermined shape, thereby forming a machined preform;
   forming a composite assembly comprising the machined preform; and
   heating the composite assembly at a sufficient temperature to pyrolyze the polymer, thereby forming a porous preform of a predetermined geometry for further processing.

2. The method of claim 1, further comprising:
   coating the porous preform with a fiber interphase material to form a coated preform;

rigidizing the coated preform to form a rigidized preform; and infiltrating the rigidized preform with a slurry comprising a particulate matrix material to form an impregnated preform; and melt infiltrating the impregnated preform with a molten metal or alloy, thereby fabricating a CMC.

3. The method of claim 1, wherein infiltrating the stack with the polymer comprises placing a polymeric sheet comprising the polymer on the stack and heating the polymeric sheet to the elevated temperature, thereby inducing flow of the polymer into interstices of the stack.

4. The method of claim 1, wherein the elevated temperature is in a range from about 80° C. to about 200° C.

5. The method of claim 1, wherein the infiltrated stack is cooled to room temperature, and further comprising, prior to cooling to room temperature, pressing the infiltrated stack to a predetermined thickness.

6. The method of claim 5, wherein the pressing comprises a pressure in a range from about 0.3 MPa to about 0.7 MPa.

7. The method of claim 1, wherein the composite assembly further comprises an additional preform selected from the group consisting of: a second machined preform and a first rigid preform.

8. The method of claim 1, wherein the composite assembly further comprises one or more infiltrated plies, each of the one or more infiltrated plies comprising a fiber arrangement embedded in a polymer.

9. The method of claim 1, wherein the sufficient temperature to pyrolyze the polymer is in a range from about 200° C. to about 1000° C.

10. The method of claim 1, wherein the polymer is selected from the group consisting of polyethylene, polyethylene carbonate, polypropylene carbonate, and polyvinyl alcohol.

11. The method of claim 1, wherein the fibers comprise a ceramic selected from the group consisting of silicon carbide and silicon nitride.

\* \* \* \* \*